Dec. 12, 1967  R. C. LUHDORFF  3,357,466
PITTING APPARATUS
Filed July 29, 1965  2 Sheets-Sheet 2
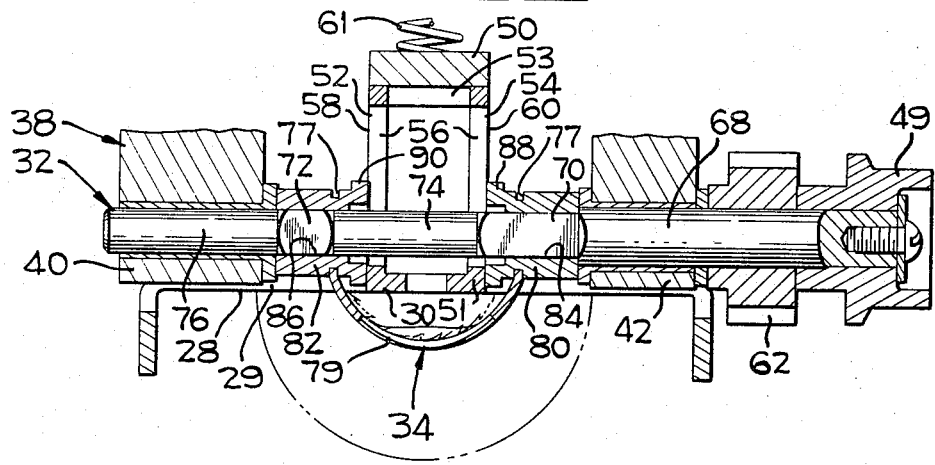
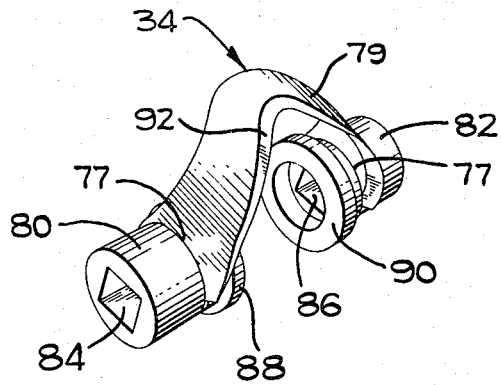
INVENTOR
ROBERT C. LUHDORFF
BY *Hans G. Hoffmeister*
ATTORNEY 3,357,466
PITTING APPARATUS
Robert C. Luhdorff, Campbell, Calif., assignor to FMC Corporation, San Jose, Calif., a corporation of Delaware
Filed July 29, 1965, Ser. No. 475,776
3 Claims. (Cl. 146—28)

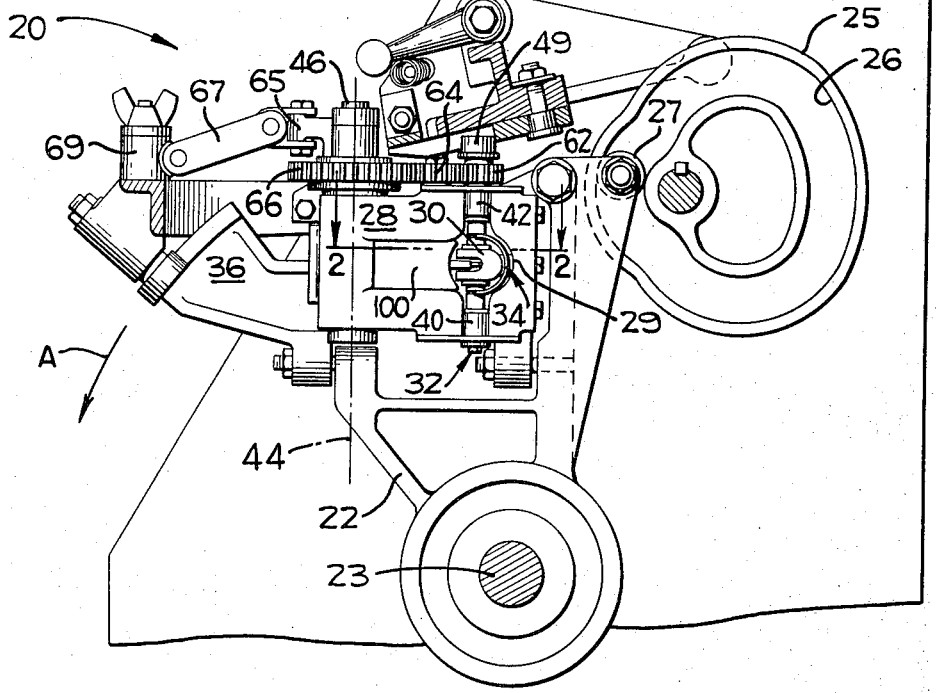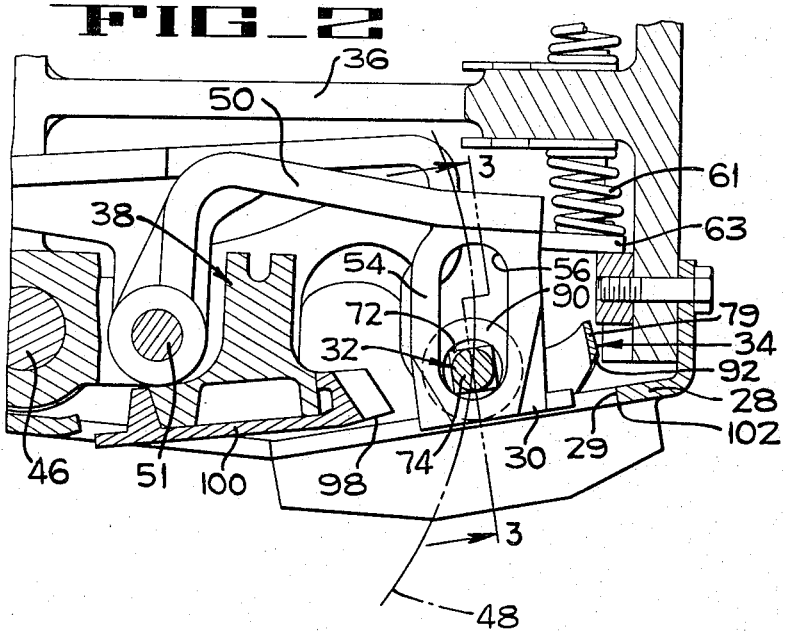

ABSTRACT OF THE DISCLOSURE

A peach pitter head has a slotted fruit half support block through which the loop knife shaft extends. The knife hubs have radial flanges which slidably engage the fruit support block along the walls of its slot, for preventing axially inward motion of the knife hubs.

---

The present invention pertains to fruit preparation machines, and more particularly relates to apparatus for pitting peaches.

More particularly, the present invention concerns an improvement of the pitting knife disclosed in U.S. Patent No. 3,045,731 to Vadas et al. In the Vadas et al. pitting head, the pitting knife is U-shaped and sweeps in an arcuate path through an opening in a pit support plate with which the cut side of the pit in a half peach is positioned. Due to variations in the conformation of peach pits, and because the pitting knife is controlled to sweep as close as possible to the pit in order to conserve the flesh of the fruit, the bight portion of the pitting knife inevitably strikes a part of one of the malformed pits. This causes a tension force on the bight of the pitting knife, which force has been discovered to ultimately deform the knife by causing the leg portions of the knife to move closer together. Thus the knife, in effect, stretches because the radial dimension of the knife from its supporting drive shaft increases as the leg portions of the knife become more and more bent toward each other. As a result, the cutting edge of the pitting knife does not travel as close to the arcuate surface of the pit as it initially did, and more fruit flesh than necessary is removed with the pit. Moreover, if this condition of the knife is not corrected, eventually the knife will become so distorted that it will collide with adjacent structure and may seriously damage expensive gears and other parts in the pitting head.

An object of the present invention is to provide an improved pitting knife for the type of peach pitting head disclosed in U.S. Patent No. 3,045,731.

Another object of the present invention is to provide an improved peach pitting knife which will not deform in use when malformed or mispositioned peach pits are struck by the cutting edge of the knife.

Another object is to provide an improved pitting knife having a lower initial cost and a longer usefulness than similar pitting knives being used at the present.

A further object is to provide a pit support and cooperating U-shaped pitting knife arranged to sweep over the pit support surface with its cutting edge, wherein the support and knife coact to maintain a minimum predetermined interspacing between the cutting edge and support surface so as to minimize the amount of fruit flesh removed with the pit.

Other objects and advantages of the present invention will become apparent from the following description, and from the accompanying drawings, wherein:

FIGURE 1 is a side elevation of a pitting head in which the improved pitting knife of the present invention is operatively mounted, parts of the machine being shown in section.

FIGURE 2 is an enlarged fragmentary section taken along lines 2—2 on FIGURE 1.

FIGURE 3 is a section indicated by the lines 3—3 on FIGURE 2, but includes the full height of the pitting head along the section plane.

FIGURE 4 is a perspective of the improved pitting knife of the present invention.

The pitting head 20 (FIG. 1) is the same pitting head used in the pitting machine disclosed in U.S. Patent No. 3,045,731 Vadas et al. and the present pitting knife may be used in lieu of the pitting knife disclosed therein. As is completely described in the above identified Vadas et al. patent, which patent is hereby incorporated by reference into the present disclosure, the pitting head 20 is secured in a cradle casting 22 that oscillates with a pivotally mounted shaft 23. During the pitting of a bisected peach, the pitting head moves forwardly in the direction of the arrow A to pit and discharge the peach, and is then swung rearward to its initial position to receive the next bisected peach. The pitting head 20 is oscillated by a cam 25 having a cam track 26 in which a cam follower roller 27 of the pitting casting 22 is mounted. Oscillation of the pitting head is effected in timed relation to two feed cups, not shown, each of which transfers half of a bisected peach into aligned relation with the pitting head while the head is near its rearward position. So aligned, each peach half has its cut side abutting a face plate 28 of the head around an opening 29 in the plate and its pit resiliently supported by means including the outer surface of a spring-loaded auxiliary fruit support block or plate 30.

The fruit support block 30 has a knife-actuating shaft 32 extending therethrough. The U-shaped pitting knife 34 of the present invention is mounted on said shaft for movement in an arcuate path through the opening 29 and around the end of the fruit support block 30, during which movement the knife severs the pit from the flesh of the peach.

More specifically, and with continued reference to FIGURE 1, the head is provided with a central partition 36, and the mechanism to be presently described is located at one side of the central partition. Counterpart mechanism is located at the other side of the partition, and both of said mechanisms operate in unison upon opposite halves of a bisected peach with their respective pitting knives 34.

Each pitting knife 34 is mounted in a knife support lever 38 which is provided at its free end with spaced bosses 40 and 42 (FIG. 3) that rotatably support the knife actuating shaft 32. At its opposite end the lever 38 is mounted for pivotal movement about the upright axis 44 (FIG. 1) of a pivot shaft 46 that is rotatably journalled in bosses (not shown) projecting laterally from the central partition 36. Thus mounted, the knife actuating shaft 32 (FIG. 2) is capable of limited movement along an arcuate path 48 under control of a cam follower 49 for the purpose, as is described in detail in the patent, of positioning the pitting knife at a predetermined distance laterally of the pitting head.

Pivotally mounted on a shaft 51 carried by the knife lever 38 is rearwardly extending lever 50 (FIGS. 2 and 3) which carries the fruit support block 30 for movement along an arcuate path adjacent the arculate path 48 of the knife actuating shaft 32. The fruit support block 30 is a cage-like member having two vertically spaced arms 52 and 54 (FIGS. 2 and 3) which interconnect a flat front wall 51 and a back wall 53 with the lever 50. The arms 52 and 54 are each provided with an elongate slot 56 through which the knife actuating shaft 32 projects, and have flat and parallel outer surfaces 58 and 60 which coact with parts of the pitting knife 34 to prevent deformation of the pitting knife and thus prolong its usefulness, as well as to ensure the optimum cutting action to remove the peach pits with minimum waste of the flesh of the fruit. A spring 61 (FIG. 2) is disposed between the central partition 36 of the body portion of the head and an arm 63 extending from the cage-like portion of the support block 30.

The knife actuating shaft 32 (FIG. 3) has a gear 62 secured to one end portion which meshes with an idler gear 64 (FIG. 1) which is also mounted on the knife carrier frame 38 and is in mesh with a drive gear 66 that is disposed on the pivot axis 44 of the knife carrier frame. A drive lever 65 is connected to drive gear 66 and to a linkage 67 that is pivoted on a fixed post 69. The arrrangement is such that, when the pitting head is moved forwardly, the shaft 32 is rotated to swing the knife through the opening 29 in the plate 28 to make an arcuate cut around the pit.

The knife actuating shaft 32 (FIG. 3) has a large diameter portion 68 extending through the boss 42, and a reduced portion having square cross-sections at 70 and 72, intermediate and below which are cylindrical portions 74 and 76, respectively.

The pitting knife 34 (FIG. 4) is provided with hub portions 80 and 82 which are provided with circumferential grooves 77 in which the end portions of a U-shaped, high strength steel blade 79 are silver-soldered. The hubs are broached with square apertures 84 and 86 that respectively engage the square portions at 70 and 72 of the knife actuating shaft 32. By partially withdrawing the knife actuating shaft 32 large end first until the flat area at 72 is centered relative to the pitting knife 34, the knife hubs 82 and 84 are respectively disposed on the circular shaft portions 74 and 76, whereby the drive connection between the shaft and knife is broken and the gear 62 is out of mesh with the idler gear 64 (FIG. 1). Timing adjustments of the knife actuating shaft 32 and of the pitting knife, therefore, can be carried out independently of the other movable parts in the pitting head. By fully withdrawing the knife actuating shaft 32, the pitting knife 34 can be readily replaced and timed.

An important feature of the present invention is the cooperation of the arms 52 and 54 (FIG. 3) of the fruit support block 30, with confronting, enlarged bearing flange portions 88 and 90 (FIG. 4) that are integrally formed on the hubs 80 and 82 of the pitting knife 34. The inner faces of the flanges 88 and 90 are flat, parallel to each other, and are so spaced apart that they bear against the corresponding surfaces 58 and 60 of the arms 52 and 54.

The outside diameter of each flange 88 and 90 is considerably larger than the adjacent slot 56 in the arm 52 or 54 so that a generous bearing surface is provided between the interengaged portions of the arms and flanges, and so that the hubs 80 and 82 are positively maintained in spaced apart relation. Referring to FIGURES 2 and 4, it has been discovered that the leading, sharpened cutting edge 92 of the pitting knife 34 will occasionally strike a peach pit which does not conform to the more or less average peach pit, and that the resultant force upon the bight portion of the pitting knife will tend to force the pitting knife hub flanges 88 and 90 together.

In the use of prior art pitting knives of the same general type, such as the pitting knives in the aforementioned Vadas et al. patent, this problem was appreciated, but there did not appear to be any practical solution without redesigning much of the pitting head. The patented knife did not have the interengaging hub and arm bearing surfaces provided between the flanges 88, 90 and the arms 52, 54. As a consequence, the cumulative effect when the knife repeatedly struck the peach pits, was that the hubs of the knife moved toward each other and the bight of the knife was thereby moved radially outward from its knife support shaft. Unfortunately, this condition was not readily apparent, without continuous examination of the pitted fruit to see if more fruit flesh was being cut out than was necessary to remove the pit, because the deformation could occur so rapidly. While it was possible to make adjustments to compensate for a deformed knife, if such deformation was detected in time, it could occur rapidly to the extent that the knife would not clear adjacent mechanical structure, such as the edges at 98 of a ramp plate 100 formed on lever 38, or the edge at 102 of a fruit support plate 28. This could, and did, produce mechanical damage to the pitting head assembly.

The present pitting knife 34 and its cooperative association with the fruit support plate arms 52 and 54 is the result of the solution of the aforementioned problem. The pitting knife 34, as in the case of the prior art pitting knife mentioned above, is spring urged so that the cutting edge of the knife closely follows the arcuate contour of the pit and can accommodate variations in the general profile of the pit. However, both pitting knives inevitably strike portions of pits which do not have more or less normal profiles, and the bight of the knife is thus tensioned to a greater degree than when it avoids cutting contact with the pit. It has been found that as a result of such tensioning, the hubs 80 and 82 are urged toward each other, and if this movement is unchecked, the dimension of the pitting knife along the knife actuating shaft 32 will eventually diminish to such degree that the radial dimension of the knife increases measurably. It follows, then, that with the knife thus "stretched," more fruit flesh than necessary is removed when the pit is cut out, and that an aggravated condition of this problem can cause the knife to strike the edge 98 of the ramp plate or 103 of the fruit support plate 28. In the latter instance, the damage to the pitting head can be extensive, not only mechanically, but also in terms of production losses due to shutdown, repair labor, and similar costs. These problems, however, have been eliminated in the present pitting knife since the bearing flanges 88 and 90 on the inner ends of the hubs maintain sliding contact along the slotted arms 52 and 54 of the fruit support plate 30, and thereby prevent any change in the axial dimension of the pitting knife 34. Consequently, any increase of the radial dimension of the pitting knife could only result from actual stretch of the high-strength metal knife blade, and this, of course, is of no practical consideration due to the composition of the blade. A related problem which is overcome by the present "non-stretch" knife construction is that no periodic adjustments are required, as was formerly the case where deformation of the prior art pitting knives could be offset, to some degree, by mechanical adjustment of the pitting head. A further improved result afforded by the present pitting knife is that the edge 98 (FIG. 2) of the plate 100 comprises a shear edge for the knife, and it is desirable to keep the shear edge as close as possible to the path of the knife so as to resist tearing of the fruit flesh and to produce a clean cut edge. Since the former pitting knives "stretched" it was necessary to provide extra clearance to accommodate a stretched knife. The present knife however, does not stretch, and the edge 98 can thus be maintained very close to the knife.

The cooperative association of the pitting knife and fruit support herein disclosed has provided a practical solution to a long standing problem, has increased the yield of fruit over the similar prior art pitting knives, and has eliminated physical damage to the knives and/or the pitting head. While these unique results have been achieved, the pitting knife of the present invention is actually not as costly than the less efficient prior art pitting knives, and produces more uniform and better results than were heretofore achieved. Further, the knife has a longer useful life, and thus directly contributes to reduced cost for the end product.

While a particular embodiment of the apparatus of the present invention has been herein shown and described, it will be apparent that modification and variation may be made without departing from the spirit of the invention, and that the scope of the invention should be limited only by proper interpretation of the claims appended hereto.

Having thus described the invention, that which is believed to be new, and for which protection by Letters Patent is desired, is:

1. In a fruit half pitter head of the type wherein the head has apertured fruit support block with a support surface arranged to engage the pit side of an unpitted fruit half, a knife carrier on said head, a knife support shaft rotatable in said carrier and disposed substantially parallel to said fruit support surface, said knife shaft extending through the aperture in said fruit support block, and a U-shaped pitting knife having hub portions slidably mounted on said shaft with leg portions connected to said hub portions for straddling said fruit support, said pitting knife also having a central bight portion connecting said leg portions having a cutting edge, said bight portion sweeping over said support surface upon rotation of said knife support shaft; the improvement wherein each of said knife hub portions projects axially outwardly from its leg portion and has a non-circular aperture, said knife support shaft having a corresponding cross-sectional configuration for keying the pitting knife hub portions to the shaft, and wherein radial flanges are formed on the axially inner end of each hub portion, said flanges being in sliding contact with the adjacent surfaces of said fruit support block to maintain the knife legs in spaced apart relation and thus resist radial elongation of the central bight portion of said knife.

2. The pitter head of claim 1, wherein grooves are formed in said knife hub portions said grooves having side walls embracing and secured to each knife leg, and wherein the width of the grooves exceeds the corresponding dimension of said knife legs sufficiently to accommodate bonding material, so as to attain maximum bonding area between the hubs and the legs.

3. In a fruit half pitter head of the type wherein the head provides an apertured main fruit-half support plate and a slotted auxiliary fruit-half support block pivotally mounted on said head and terminating within said main plate aperture, a knife carrier pivotally mounted on said head and having spaced bosses, a knife shaft extending through said bosses and the slot in said auxiliary support block, and a loop knife having hubs slidably keyed on said shaft between said bosses and the auxiliary support block; the improvement wherein each knife hub projects axially inwardly from its connection with the knife and terminates in an enlarged flange, said hub flanges being in sliding engagement with said auxiliary support block along the walls of the slot in said block for precluding an increase in the radial dimension of the loop knife caused by axially inward motion of said knife hubs.

References Cited

UNITED STATES PATENTS

| | | | |
|---|---|---|---|
| 2,775,278 | 12/1956 | Anderson | 146—28 |
| 2,946,361 | 7/1960 | Skog et al. | 146—28 |
| 3,010,501 | 11/1961 | Anderson | 146—28 X |

JAMES M. MEISTER, *Primary Examiner.*